United States Patent Office 3,711,249
Patented Jan. 16, 1973

3,711,249
METHOD FOR DETECTING CORROSION INHIBITOR IN AQUEOUS ACID SOLUTIONS
Billy R. Keeney, Duncan, Okla., assignor to Halliburton Company, Duncan, Okla.
Continuation-in-part of abandoned application Ser. No. 819,795, Apr. 28, 1969. This application Apr. 14, 1971, Ser. No. 134,048
Int. Cl. G01n 33/00
U.S. Cl. 23—230 R  18 Claims

ABSTRACT OF THE DISCLOSURE

Method for simply and inexpensively determining the presence of a corrosion inhibitor in an aqueous acid solution. Gas evolving from a material which will react with uninhibited aqueous acid solutions to evolve such a gas causes a small first container to rise to the surface of a liquid in a larger second container, thus indicating the absence of acid corrosion inhibitor. If the first container does not float, acid corrosion inhibitor is present.

---

This is a continuation-in-part of application Ser. No. 819,795; filed Apr. 28, 1969, and now abandoned.

The present invention relates to a method for determining the presence of corrosion inhibitor in aqueous acid solutions.

Aqueous acid solutions are used in a variety of applications. For example, aqueous acid solutions are commonly used for removing scale from industrial and oil field equipment. A corrosion inhibitor is ordinarily added to the acid solution to prevent the acid from attacking metal surfaces within such equipment while the scale is being removed therefrom.

In these and many other applications for aqueous acid solutions, it often becomes necessary to determine whether or not the aqueous acid solution contains an inhibitor composition. Prior to the present invention, it has been necessary to carry out an expensive and elaborate analysis of a particular aqueous acid solution in order to determine whether or not an inhibitor composition is contained therein. Often times, the acid solution is located in the oil field, and facilities for carrying out such an analysis are not readily available.

Accordingly, by this invention there is provided a simple and inexpensive method of detecting the presence of corrosion inhibitors in an aqueous acid solution which comprises filling a small container with an aqueous acid solution, the container having disposed therein a quantity of material which will react with an uninhibited aqueous acid solution to evolve hydrogen or other gases, immersing the first container open end down in a quantity of liquid in a second larger container, and noting whether said first container is buoyed to the top of the liquid in said second container by the evolution of gases in the first container. The liquid in the second container may be water or a second portion of the acid sought to be tested. The liquid in the second container may be heated to provide faster and more accurate results.

The material for producing hydrogen or other gases upon contact with uninhibited aqueous acid solutions may be any such material but is preferably steel wool. When used in the preferred small first container, the steel wool should be present in a weight of from about 0.01 gram to about 0.08 gram.

Figure 1:
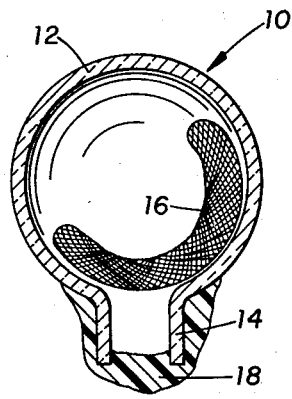

Referring now to the drawings, and particularly to FIG. 1, an apparatus useful in the present invention is generally designated by the numeral 10. The apparatus 10 basically comprises a small bulbous container 12 having an open neck 14. A quantity of material 16, which will react with uninhibited aqueous acid solutions to evolve hydrogen or other gases, is disposed within container 12. A plastic or wax coating 18 is disposed over the neck 14 of container 12 to prevent atmospheric corrosion of the material 16 from taking place. The coating 18 may be easily removed just prior to use of the apparatus 10.

The bulbous container 12 of the apparatus 10 is preferably formed of glass, and the material 16 disposed within container 12 is preferably formed of steel wool.

Figure 2:
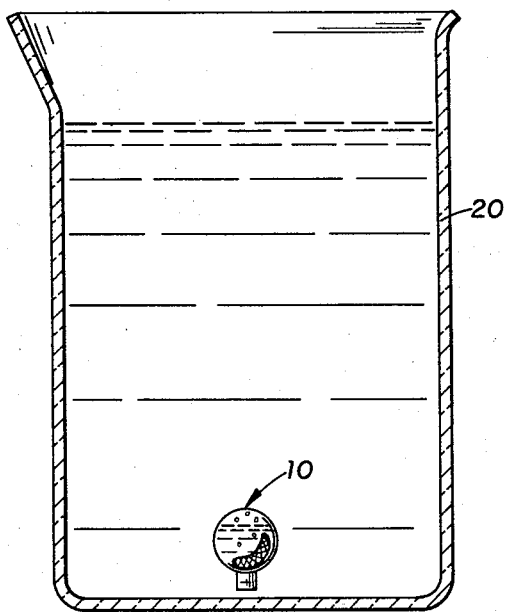
Figure 3:
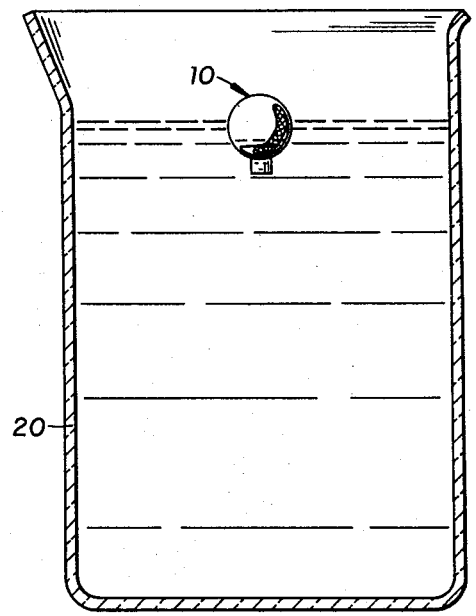

The presence of a corrosion inhibitor in a particular aqueous acid solution may be determined in the following manner using the apparatus 10. Referring to FIGS. 2 and 3, a sample of the aqueous acid solution to be tested is placed in a beaker 20, or other suitable container, and can be heated to a temperature of approximately 150° F. As will be discussed further herein, the heating of the test solution is helpful to break down surface active agents which may have been added to the aqueous acid solution to prevent emulsions.

The plastic or wax coating 18 is removed from the apparatus 10, and the apparatus 10 is filled with a portion of the test solution through the neck 14 with an eye dropper or by other suitable means. As soon as the apparatus 10 has been filled with test solution, it is dropped into the beaker 20 such that the open neck 14 is down. The weight of the apparatus 10 will cause it to pass to the bottom of the beaker 20.

The apparatus 10 can be formed so that the neck 14 thereof is of greater mass than the bulbous portion thereof. Thus, when the apparatus 10 is placed in the test solution, the neck 14 of the apparatus 10 will face downwardly as illustrated in FIG. 2.

If a corrosion inhibitor composition is present having a relatively high concentration, the apparatus 10 will remain at the bottom of the beaker 20. However, if only a small concentration of a corrosion inhibitor composition is present, or no corrosion inhibitor composition is present, the aqueous acid solution will react with the material 16 disposed within the container 12, and hydrogen or other gases will be evolved. The gases evolved will rise to the top portion of the container 12 thereby displacing the aqueous acid solution within container 12. When enough aqueous acid solution has been displaced from the container 12, it will be buoyed up by the gases therein, and rise to the top of the test solution as illustrated in FIG. 3.

By noting the time elapsed between when the apparatus 10 is immersed in the test solution and when the apparatus 10 rises to the top of the test solution, the approximate concentration of corrosion inhibitor composition in the slution tested may be determined, as will be explained further herein.

The small first container such as container 12 in the drawing may be made of any material which will not react with uninhibited aqueous acid solutions to produce hydrogen or other gases. Preferably, the first container is made of glass and consists of a one-milliliter ampoule having a length of about 2.5 inches.

The larger second container may be any container large enough to contain the first container and a liquid and to allow the first container to float in the liquid. Preferably, the second container is large enough to hold about 250 cubic centimeters of liquid and has a diameter of less than about 2.5 inches.

The liquid in the larger container may be water or a second sample of the aqueous acid solution sought to be tested. This liquid must be present in an amount adequate to permit the first container to float in it. Preferably, about 250 cubic centimeters of this liquid is present.

In the preferred method, the steel wool is placed in the one milliliter glass ampoule and the ampoule is filled with the aqueous acid solution sought to be tested.

The ampoule is then dropped open end down into the second container which holds about 250 cubic centimeters of water. The water has been heated to boiling and removed from the heat source.

The heat transferred from the water to the aqueous acid solution is effective to overcome the weak inhibiting properties of surface active agents which may have been added to the aqueous acid solution sought to be tested. Such surface active agents would interfere with the production of hydrogen by uninhibited aqueous acid solutions in contact with the steel wool at room temperature.

The position of the ampoule is then observed in the water. If the ampoule remains on the bottom of the second container for at least one minute, it may be noted that acid corrosion inhibitor is present in the aqueous acid solution. However, if the ampoule is buoyed to the surface of the water within one minute it may be noted that the aqueous acid solution contains no acid corrosion inhibitor.

The one-minute test is useful for aqueous acid solutions having an acid concentration of up to about 15% by weight and a temperature in excess of about 150° F. Other test times may be calculated for stronger acids.

The following are examples of the method of the present invention and are intended only to further describe certain aspects of said method. The examples are given primarily for the purpose of illustration; and the invention, in its broader aspects, is not to be construed as limited thereto.

TABLE I.—COMPARISON OF TIMES REQUIRED FOR TEST BULBS TO FLOAT IN UNINHIBITED AQUEOUS ACID SOLUTIONS AT VARIOUS TEMPERATURES

Type of acid used, HCl

| Acid concentration, weight percent | Temperature, ° F. | Time for bulb to float, seconds |
|---|---|---|
| 15 | 40 | 235 |
| 15 | 72 | 160 |
| 15 | 100 | 69 |
| 15 | 150 | 10 |

From the above, it can be seen that the time required for the test bulb to float in an uninhibited aqueous acid solution descreases as the temperature of the aqueous acid solution is increased. A temperature of at least 150° F. is preferred in that the bulb will float in an uninhibited aqueous acid solution in a relatively short time.

TABLE II.—COMPARISON OF TIMES REQUIRED FOR TEST AMPOULES TO FLOAT IN AQUEOUS ACID SOLUTIONS AT VARIOUS TEMPERATURES WITH A SURFACE ACTIVE AGENT ADDED

Type of acid used, HCl
Type of surface active, cationic blend

| Temperature, ° F. | Acid concentration, weight percent | Surface active agent concentration, volume percent | Time for test ampoule to float |
|---|---|---|---|
| 40 | 15 | 0.5 | >30 min. |
| 72 | 15 | 0.5 | >30 min. |
| 100 | 15 | 0.5 | 24 min. |
| 150 | 15 | 0.5 | 87 sec. |
| 180 | 15 | 0.5 | 38 sec. |

From the above, it can be seen that a typical surface active agent commonly added to aqueous acid solutions to prevent emulsions exhibits corrosion inhibiting properties at low temperatures. At temperatures of greater than about 150° F. the surface active agent is sufficiently broken down to allow the detection of the presence of corrosion inhibitor compositions within one minute.

TABLE III.—COMPARISON OF TIMES REQUIRED FOR TEST AMPOULES TO FLOAT IN AQUEOUS ACID SOLUTIONS CONTAINING VARIOUS CONCENTRATIONS OF CORROSION INHIBITOR COMPOSITION

Type of acid used, HCl
Test temperature, >150° F.

| Corrosion inhibitor composition concentration, percent | Acid conc., wt. percent | Wt. of steel wool in test ampoule, grams | Time for test ampoule to float |
|---|---|---|---|
| 0.1 | 15 | 0.0704 | 3 min., 55 sec. |
| 0.1 | 15 | 0.0710 | 3 min., 59 sec. |
| 0.1 | 15 | 0.0696 | 3 min., 48 sec. |
| 0.2 | 15 | 0.0604 | >30 min. |
| 0.2 | 15 | 0.0687 | >30 min. |
| 0.2 | 15 | 0.0693 | >30 min. |
| 0.3 | 15 | 0.0683 | >30 min. |
| 0.3 | 15 | 0.0697 | >30 min. |
| 0.3 | 15 | 0.0679 | >30 min. |

From the above table, it can be seen that when a weight of steel wool of approximately 0.07 gram is used in the method of the present invention, the method is effective for detecting the presence of corrosion inhibitor composition in a 15% hydrochloric acid solution.

EXAMPLE IV

A test is performed to determine the effect of boiling the liquid in the larger container prior to placing the ampoule containing the acid solution sought to be tested into the liquid. Tests are run using cationic surfactants and acid corrosion inhibitors as indicated in Table IV, below.

The liquid (250 cubic centimeters) is boiled in a container having a diameter of less than about 2.5 inches. As soon as boiling is observed, the liquid is removed from the heat source and the ampoule containing steel wool and the acid solution sought to be tested is placed in the liquid. The time required for the ampoule to rise to the surface of the liquid is observed.

As indicated in Table IV, the ampoules containing acid solutions with only surfactants added rise to the surface of the liquid in less than 60 seconds, while the ampoules containing only 0.1% by weight acid corrosion inhibitor remained submerged in the second liquid for longer than 60 seconds.

Table IV thus indicates the simple method of the present invention used in Example IV is effective to determine the presence or absence of acid corrosion inhibitors in acid solutions which contain surfactants without the use of equipment to accurately control the temperature of the liquid in the larger container.

TABLE IV

Corrodent, 15% HCl
Metal, 0.02 gram steel wool/ampoule

| Type of surfactant and concentration | Concentration of inhibitor, percent | Time for test ampoule to float |
|---|---|---|
| None | None | 5 sec. |
| 0.5% cationic | None | 32 sec. |
| Do | None | 33 sec. |
| Do | None | 31 sec. |
| Do | 0.1 | >1 min. |
| None | 0.1 | >1 min. |
| Do | 0.1 | >1 min. |
| Do | 0.1 | >1 min. |
| Do | 0.1 | >1 min. |

EXAMPLE V

A test is run to determine the effect of using a relatively cold acid solution containing a cationic surfactant in the procedure of Example IV. The test results in Table V, below, indicate the low temperature of the acid solution does not adversely affect the operability of the method of the present invention.

TABLE V

| Concentration of surfactant, percent | Acid solution temperature, °F. | Time for test ampoule to float, sec. |
|---|---|---|
| 0.5 | 72 | 32 |
| 0.5 | 40 | 31 |

While presently preferred embodiments of the invention are given for the purpose of disclosure, numerous changes in the details of the method can be made which will readily suggest themselves to those skilled in the art and which are encompassed within the spirit of the invention disclosed herein.

What is claimed is:

1. A method for detecting the presence of a corrosion inhibitor in an aqueous acid solution which comprises the steps of:
    filling a small first container with a portion of said aqueous acid solution, said first container having a particular quantity of material disposed therein which will react with uninhibited aqueous acid solutions to evolve hydrogen or other gases;
    immersing said filled first container open end down in a second liquid contained in a larger second container; and
    noting that said first container is not buoyed to the top of said second liquid by the evolution of said gases therein, whereby the presence of an acid corrosion inhibitor in the aqueous acid solution is indicated.

2. The method of claim 1 wherein said small first container is a one-milliliter glass ampoule having a length of about 2.5 inches.

3. The method of claim 1 wherein said second liquid is water, said water being present in an amount of at least about 250 cubic centimeters.

4. The method of claim 1 wherein said second liquid is a second portion of said aqueous acid solution sought to be tested, said second liquid being present in an amount of at least about 250 cubic centimeters.

5. The method of claim 1 wherein said second container is capable of containing about 250 cubic centimeters of liquid and has a diameter of less than about 2.5 inches.

6. The method of claim 1 wherein said second liquid is heated to at least about 150° F. prior to immersion of said first container in said second liquid.

7. The method of claim 1 wherein said second liquid is heated to boiling prior to immersion of said first container in said second liquid.

8. The method of claim 1 wherein said material is steel wool.

9. The method of claim 8 wherein said steel wool is present in said first small container in an amount of from about 0.01 gram to about 0.08 gram.

10. The method of detecting the absence of acid corrosion inhibitor in an aqueous acid solution which comprises the steps of:
    filling a small first container with a portion of said aqueous acid solution, said first container having a particular quantity of material disposed therein which will react with uninhibited aqueous acid solutions to evolve hydrogen or other gases;
    immersing said filled first container open end down in a liquid contained in a larger second container; and
    noting that said first container is buoyed to the top of said second liquid by the evolution of said gases therein, whereby the absence of acid corrosion inhibitor in said aqueous acid solution is indicated.

11. The method of claim 10 wherein said small first container is a one-milliliter glass ampoule having a length of about 2.5 inches.

12. The method of claim 10 wherein said second liquid is water, said water being present in an amount of at least about 250 cubic centimeters.

13. The method of claim 10 wherein said second liquid is a second portion of said aqueous acid solution sought to be tested, said second liquid being present in an amount of at least about 250 cubic centimeters.

14. The method of claim 10 wherein said second container is capable of containing about 250 cubic centimeters of liquid and has a diameter of less than about 2.5 inches.

15. The method of claim 10 wherein said second liquid is heated to at least about 150° F. prior to immersion of said first container in said second liquid.

16. The method of claim 10 wherein said second liquid is heated to boiling prior to immersion of said first container in said second liquid.

17. The method of claim 10 wherein said material is steel wool.

18. The method of claim 17 wherein said steel wool is present in said first small container in an amount of from about 0.01 gram to about 0.08 gram.

References Cited

UNITED STATES PATENTS 2,827,724   3/1958   Edds _____ 23—253 C X

MORRIS O. WOLK, Primary Examiner

R. M. REESE, Assistant Examiner

23—230 C, 253 R, 253 C